United States Patent [19]
Hirao et al.

[11] 3,894,128
[45] July 8, 1975

[54] TRAY FOR FLUID CONTACTOR APPARATUS

[75] Inventors: Shoichi Hirao, Kakogawa; Satoshi Ihara, Akashi; Kanji Ueda, Ashiya, all of Japan

[73] Assignee: Seitetsu Kagaku Co., Ltd., Japan

[22] Filed: Nov. 9, 1973

[21] Appl. No.: 414,301

Related U.S. Application Data

[62] Division of Ser. No. 116,450, Feb. 18, 1971, Pat. No. 3,807,711.

[30] Foreign Application Priority Data
Feb. 27, 1970  Japan.............................. 45-17415
Mar. 30, 1970  Japan.............................. 45-27127

[52] U.S. Cl......... 261/114 VT; 137/512.1; 137/513
[51] Int. Cl.............................................. B01f 3/04
[58] Field of Search ........ 261/114 VT; 137/512.1, 137/513

[56] References Cited
UNITED STATES PATENTS

| | | | |
|---|---|---|---|
| 2,636,510 | 4/1953 | Mercier et al. | 137/512.1 |
| 2,718,900 | 9/1955 | Nutter | 261/114 VT |
| 2,846,204 | 8/1958 | Gilmore | 261/114 VT |
| 3,105,862 | 10/1963 | Doering, Jr. | 261/114 VT |
| 3,139,108 | 7/1964 | Klingman | 137/512.1 |
| 3,179,389 | 4/1965 | Nutter | 261/114 VT |
| 3,346,007 | 10/1967 | Agnon | 137/512.1 |
| 3,591,947 | 7/1971 | Sexton | 261/114 VT |

FOREIGN PATENTS OR APPLICATIONS

| | | | |
|---|---|---|---|
| 1,020,653 | 2/1966 | United Kingdom | 261/114 VT |
| 641,122 | 5/1962 | Canada | 261/114 VT |

*Primary Examiner*—Tim R. Miles
*Attorney, Agent, or Firm*—Craig & Antonelli

[57] ABSTRACT

A tray for fluid contacting comprises a plurality of longitudinally extended movable elements and their supporting members. The movable elements are arranged and supported on and across said supporting members and are movable according to a load of a fluid applied to the tray, whereby fluid passages corresponding to the load of the fluid are formed between the adjacent movable elements and the fluid contact is carried out through the fluid passages. At least one interconnecting element can be engaged with the movable elements in a traversing direction to move said movable elements together at the same time to an equal degree of opening. An effective fluid contact can be attained with the present tray within a wide range of loads of a fluid.

7 Claims, 6 Drawing Figures

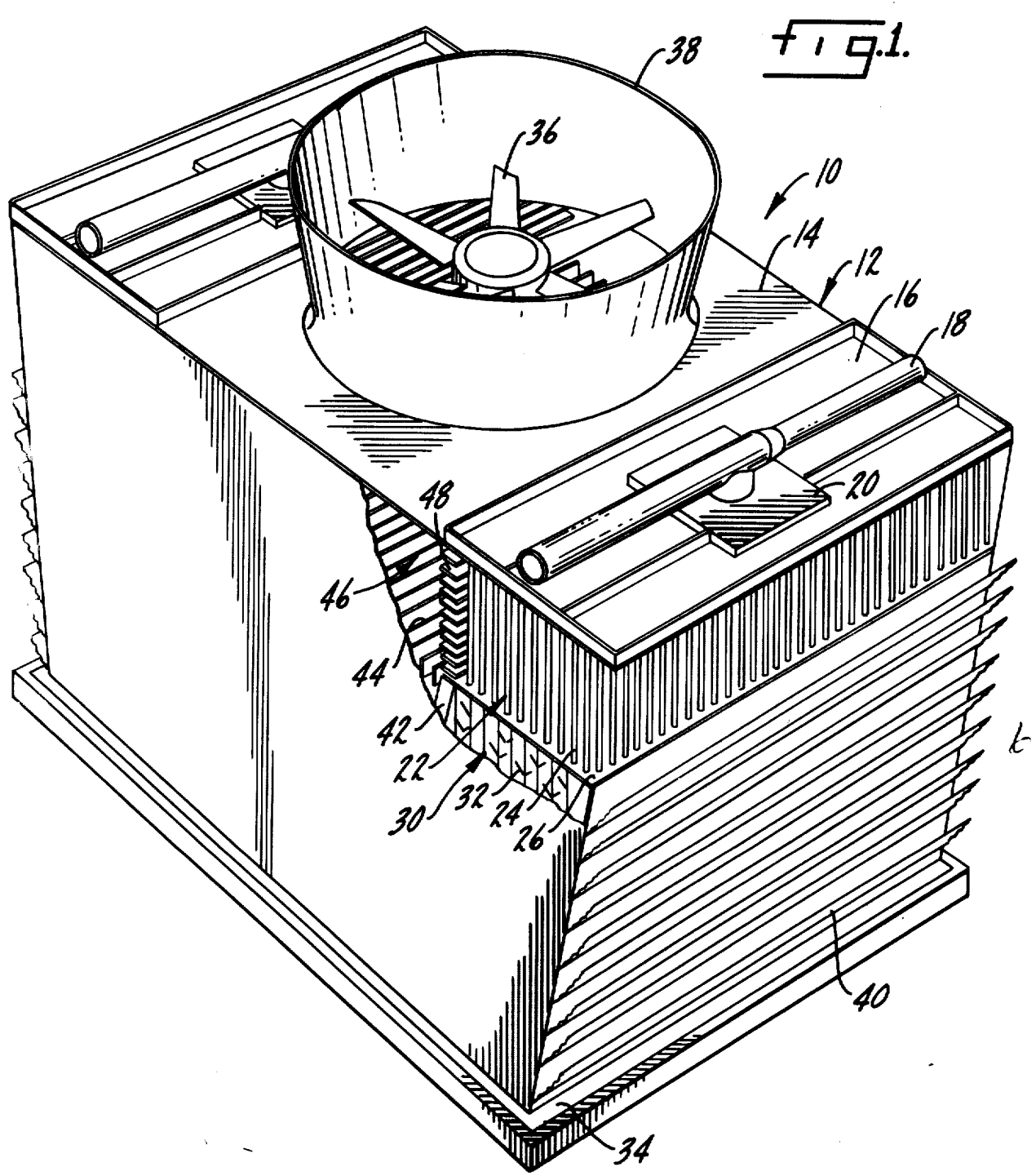

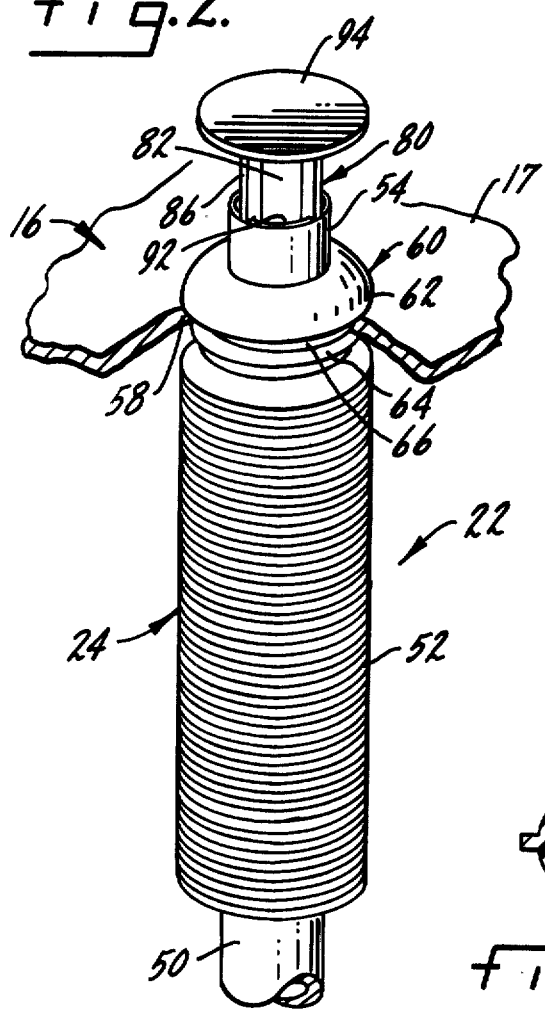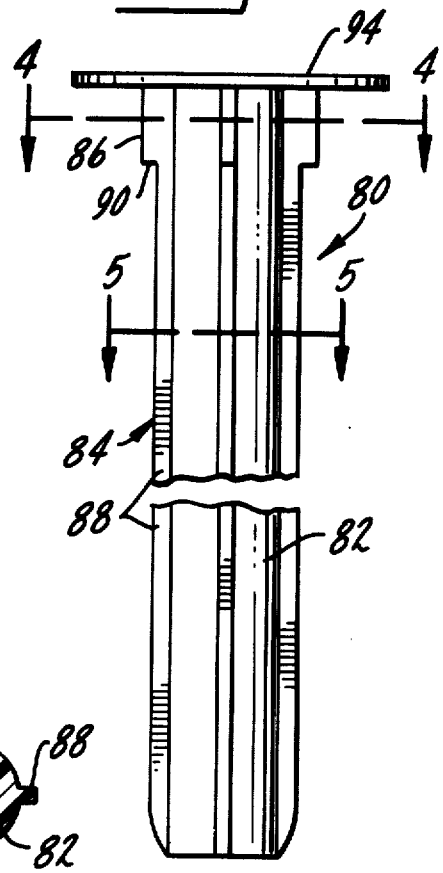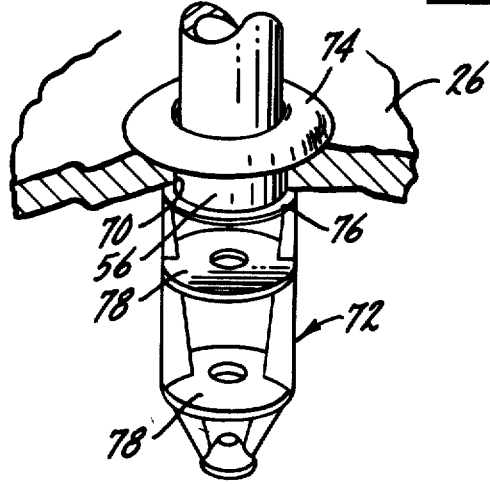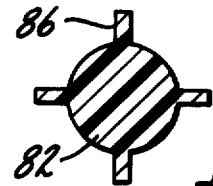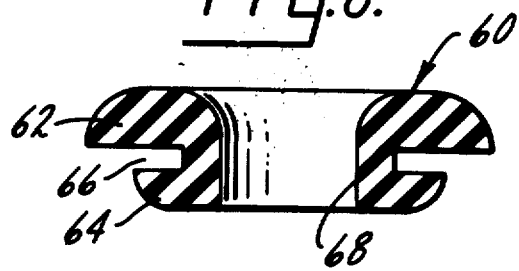

TRAY FOR FLUID CONTACTOR APPARATUS

This a division of application Ser. No. 116,450 filed Feb. 18, 1971, now U.S. Pat. No. 3,807,711.

This invention relates to a tray of novel structure for a fluid contactor apparatus, and more particularly a tray comprising a large number of longitudinally extended elements and their supporting members, the respective elements being arranged and supported on their supporting members in a pivotally movable manner according to a flow of a fluid thereby to form fluid passages between said pivotally movable elements themselves.

Heretofore, various kinds of trays have been used in the fluid contactor apparatuses directed to distillation, absorption, extraction and other masstransfer or heat transfer operations.

For example, a Turbogrid tray is disclosed in "Chemical Engineering Progress, 50 No. 2 pages 57 – 64 (1954)," where a large number of bars are placed on supporting members (supporting bars or frame) fixed to the wall of a column at a suitable slot distance between the adjacent bars thereby to form a tray of fixed arrangement or a large number of slots are provided on a fixed tray board thereby to finally obtain a tray having the same structure as that obtained by placing a large number of bars on the fixed supporting members as mentioned above, and a desired fluid contact is carried out through the fluid passages, that is, slots, between the fixed bars.

The fluid contactor apparatus based on such Turbogrid trays is simple in structure, but often fails to meet a slight fluctuation in a fluid flow rate, because the balance of fluid contacting operation is kept only by the flow conditions of the fluid. That is, there are such disadvantages that the stable operating range is very narrow and the operating conditions must be severely controlled.

As another example, a valve tray is disclosed in "Chemical Engineering, 16 No. 5, pages 173 – 178 (1954)," wherein a movable lid (valve disc) corresponding to a shape of an opening part is provided on the opening part on a fixed plate, which constitutes a major portion of a tray, the lid is supported in a movable state according to a flow of a fluid thereby to form a passage for an uprising fluid between the fixed plate and the movable lid, and a fluid contact is carried out through said passage. However, the fluid contactor apparatus based on such a valve tray has a considerably complicated structure, because the tray consists of a fixed plate and a large number of small movable lids and their retaining pieces, and an increase in the available contacting area per tray is limited. That is, an increase in a contacting capacity cannot be expected in such an apparatus.

As a result of studies and researches on the trays to eliminate said disadvantages encountered in the prior art trays, the present inventors have found that fluid passages can be formed without using any fixed board or plate at the fluid contact part of the tray, and have completed a novel tray wherein the fluid passages formed between the fixed parts or between the fixed part and the movable part in the prior art tray are formed between the movable parts themselves and the functions of the fixed parts of the prior art tray are made to be possessed by the movable parts.

An object of the present invention is to provide a tray for a fluid contactor apparatus, where an available contacting area per tray can be freely adjusted within a wide range according to a load.

Another object of the present invention is to provide a tray for a fluid contactor apparatus, which has a wide, stably operating range, an easy operation and a good contacting effect.

Other object of the present invention is to provide a tray for a fluid contactor apparatus, whose component members are less in number and can be easily assembled.

According to the present invention, a tray for a fluid contactor apparatus comprises a plurality of longitudinally extended movable elements and their supporting members, said movable elements being arranged and supported by and across said supporting members and being movable according to a flow rate or load of a fluid thereby to form fluid passages between the adjacent movable elements themselves in correspondence to the flow rate or load of the fluid, and the fluid contact being carried out through the fluid passages. Further, according to the present invention, a plurality of said movable elements of a tray are engaged with at least one interconnecting member or a common bar in a direction traversing the direction of the movable elements thereby to make the respective movable elements at the same time to an equal degree of opening according to a load of a fluid.

That is to say, according to the present invention, the entire area of an available contact part of a tray for the contactor apparatus comprises a large number of longitudinally extended elements, for example, bars having cross-sections of a desired shape arranged in same direction on and across the fixed supporting members, for example, supporting bars. Said longitudinally extended elements, that is, the bar-like elements are supported on the supporting members in a movable or floatable state according to a flow state, that is, a flow rate or load of a fluid. Where no load is applied to the tray of such an arrangement of the movable elements, there may be slot-like passages between the adjacent movable elements on the tray, as if they were slots of the Turbogrid tray, or there may be no slot-like passages but a smooth plane of movable elements which are completely laid out so that their sides may be closely connected to each other or a rugged plane of movable elements whose sides are slightly overlapped with one another, if viewed from the overhead. In any arrangement, the respective movable elements are actuated to move or open according to the flow of a fluid and fluid passages are formed between the adjacent movable elements thereby.

As to the shape of the movable elements, flat bars, bars having at least two sides, for example, bars having a side bent vertically to the longitudinally extended direction, that is, L-shaped bars, Z-shaped bars, or solid or hollow flat or shaped bars can be used. Furthermore, movable elements having perforations for the passage of a fluid can be also used. These movable elements can be divided into at least two sections in the longitudinally extended direction, if desired, and arranged on the supporting members in at least two sections.

According to the present invention, the movable elements are supported on the supporting members through engagement with cut-away or recess parts provided on the supporting members or through mutual engagement of cut-away or recess parts provided on the movable elements with the corresponding cutaway or recess parts provided on the supporting members. Further, when the movable element has a projection at each end thereof for engagement, the projection is engaged with the corresponding opening or recess provided on the supporting member to support the movable element in a pivotally movable state. Furthermore, a supporting member can be comprised of a pair of an upper element and a lower element to provide spaces between these upper and lower elements, and the movable elements can be inserted in and supported with these spaces. In that case, it is sometimes desirable to provide the upper supporting element with a function to limit the maximum degree of opening of the movable elements.

The movable elements thus supported are actuated to adjust a degree of opening according to the flow or load of a fluid. However, some movable element is sometimes moved at a larger degree of opening while other movable elements are moved at a smaller degree of opening, depending upon a difference in performance or characteristics of the movable elements or distribution of the fluid and consequently the flow of the fluid passing through the tray becomes uneven. According to the present invention, at least one interconnecting element, that is, a common bar, which interconnects and actuates the respective movable elements at the same time at an equal degree of opening, is used to eliminate said uneven opening of the movable elements. The interconnecting element is sometimes placed on and across a set of the movable elements arranged in the tray, but in the most cases, the interconnecting element are provided with cut-away or recess parts corresponding to the respective movable elements and is engaged with the movable elements at the cutaway or recess parts. Sometimes, the movable elements are provided with cut-away or recess parts, and the interconnecting element is engaged with the movable elements at the cut-away or recess parts, or sometimes both movable elements and interconnecting element are provided with the mutually corresponding cut-away or recess parts and are engaged with one another at the cut-away or recess parts. Furthermore, sometimes the respective movable elements are provided with projections for engagement with the interconnecting element, and are engaged with the interconnecting element through these projections. Furthermore, when at least one of the interconnecting element and the set of movable elements is made to have a contact face of at least two inclinations, the respective movable elements can be moved stage-wise at the same time according to the load of the fluid, that is, the degree of opening of the movable elements can be changed stage-wise, and thus the opening of the fluid passages can be made even at the predetermined stage of the fluid flow. In any case, it is desirable that the interconnecting element is controlled or guided in parallel with the tray.

The present invention will be explained hereunder in detail, referring to the accompanying drawings:

FIG. 4 is a plan view of another embodiment of the present invention.

FIG. 5 is a cross-sectional view of another embodiment of a supporting mechanism of the present invention.

FIG. 6 is a schematic view of another embodiment of the present invention.

Figure 1:
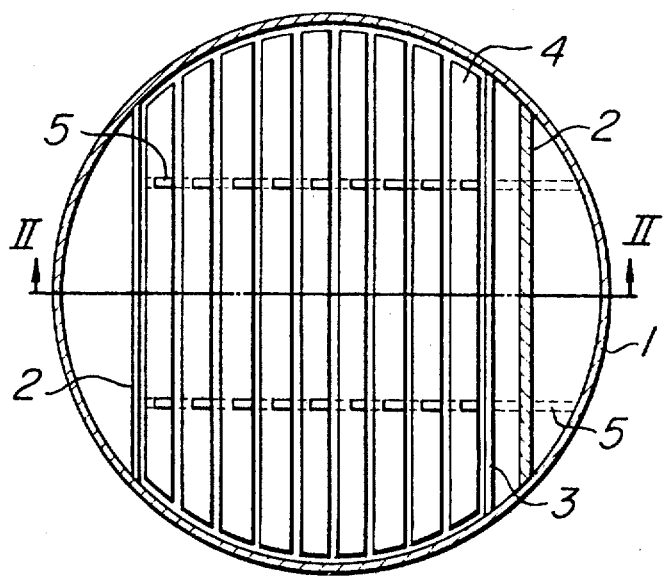
FIG. 1 is a plan view showing one embodiment of the present tray.
Figure 2:
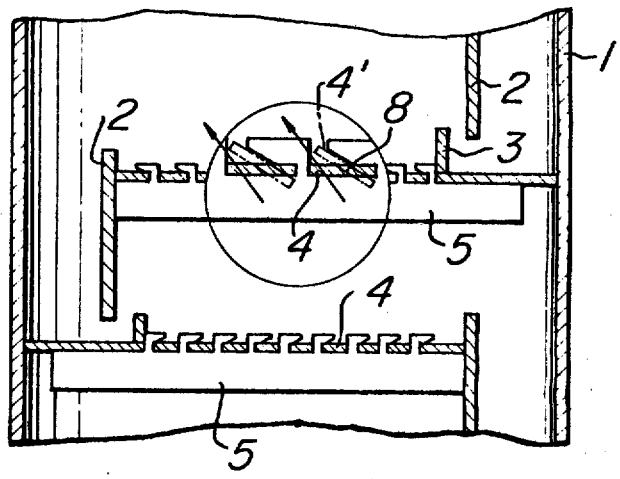
FIG. 2 is a cross-sectional view along the line II — II of FIG. 1.

In FIG. 1 and FIG. 2, numeral 1 is an outer shell of a fluid contactor apparatus having trays in a non-load state. A partition plate 2 of a downcomer used in the well-known apparatus and an overflow weir 3 in relation to the downcomer 2 are provided at a tray within the shell 1. The tray of the present invention is provided and formed at an available contact part, that is, other part than the area within the weir 3 and shell 1 including the downcomer outlet section. A large number of longitudinally extended, bar-like elements 4 are arranged in parallel at a slot distance or small distance on and across fixed supporting members or supporting bars 5 by a supporting mechanism as shown in FIG. 3.

Figure 3:
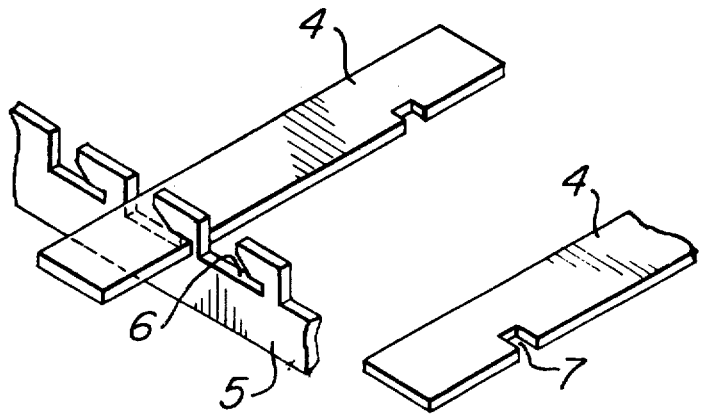
FIG. 3 is a schematic view of one embodiment of a supporting mechanism of the present invention.

According to one embodiment of a supporting mechanism as shown in FIG. 3, the supporting member has cut-away or recess parts 6, and the movable element 4 is inserted into the cut-away or recess part 6 and supported thereby. In that case, the movable element 4 can have a cut-away or recess part 7 corresponding to that of the supporting member 6 and a degree of opening formed between the adjacent movable elements under a load can be adjusted thereby. In the thus assembled tray, as shown in an expanded portion of FIG. 2, the movable element 4 moves pivotally around a contact point 8 between the movable element 4 and the supporting member as a pivot according to a load of a fluid within a range from the position under a non-load to a maximum opening position 4' of the movable element as shown in dotted line. Then, the uprising fluid passes upwards through the fluid passages formed between the adjacent movable elements and opened to a degree corresponding to the load of a fluid in a direction as shown by an arrow mark and is brought in contact with the fluid on the tray.

That is to say, in the present invention, fluid passages are formed on a tray according to the load, even if the load is increased, and the trouble due to the increase in the resistance can be avoided and furthermore the available fluid passage area can be increased thereby. That is, a stable fluid contacting operation can be carried out for a wide range of flow rates of a fluid to be treated.

On a tray of the present invention as shown in FIG. 4, the movable elements 9 are divided into two sections in the longitudinally extended direction, and are arranged and supported in two rows by the supporting members. A weir 11 is provided between these two rows to make the fluid on the tray flow in the direction as shown by an arrow mark.

In FIG. 4, the outer shell 12 is in a rectangular shape and no downcomer is provided.

In the movable elements used on the tray of the present invention, variously shaped elements having at least two sides can be used in addition to said flat elements.

In FIG. 5, the movable element 13 has a L-shaped cross-section, and is arranged on a supporting member 15 having V-shaped cut-away or recess parts 14 corresponding to the one side of the L-shaped movable elements 13. The movable elements 13 thus supported can move up to a degree of opening limited by the V-shaped cut-away or recess parts 14 on the supporting member 15, that is, can float around bottoms 16 of the cut-away or recess parts 14 as pivots up to a position 13' shown by dotted lines according to the load applied to the tray. Then, the uprising fluid passes through the fluid passages formed between the adjacent movable elements almost directly upwardly in a direction shown by an arrow line.

In FIG. 6, movable elements 17 having two sides at an acute angle or acutely shaped elements are shown, and a plurality of perforations can be sometimes provided on these two sides of the movable elements as shown in FIG. 6. Each movable element 17 has a projection 19 at each end and is supported on an L-shaped supporting member 21 provided with supporting holes 20 corresponding to the respective projections 19. On the tray comprised of the movable elements of such a shape, an area of openings of the flow passages formed between the adjacent movable elements is gradually and very effectively increased with an increase in the degree of opening of the movable elements according to the load of a fluid applied to the tray, for example, from the non-load state to the position shown by the dotted line, and the uprising fluid passes through the fluid passage along the up-right side of the movable element 17 directly upwardly and is brought in close contact with the fluid on the tray for a prolonged period of time. A provision of a large number of the perforations on the movable elements is very effective for increasing the available contacting area and enhancing the contact efficiency of the tray. An angle between the two sides of the L-shaped movable element and a ratio of cross-sectional length of one side to that of another are not limited, either.

Figure 7:
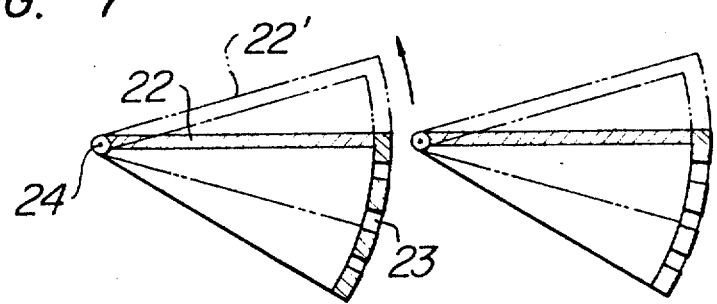
FIG. 7 is a cross-sectional view of a shaped movable members having perforations of the present invention.

In FIG. 7, a movable element 22 having a plane cross-section and an arc cross-section, that is, the one having an arc-shaped plate at one end of the plane plate, is shown, and perforations 23 are provided at the arc-shaped plate for the passage of a fluid. Each movable element 22 is supported at other end 24 of the plane plate as a pivot in a floatable state, and a number of perforations provided on the arc-shaped plates are successively exposed to and communicated with the hold-up section of the arc with an increase in the degree of floating of the movable element from the non-load state to the position 22' shown by the dotted line, in addition to the flow passage between the adjacent movable elements, and consequently a rate of a fluid passage through the perforations is increased and an area of the fluid passage is also increased thereby. Furthermore, the fluid passed through the perforations can give a specific flowing direction to the hold-up fluid on the tray.

Figure 8:
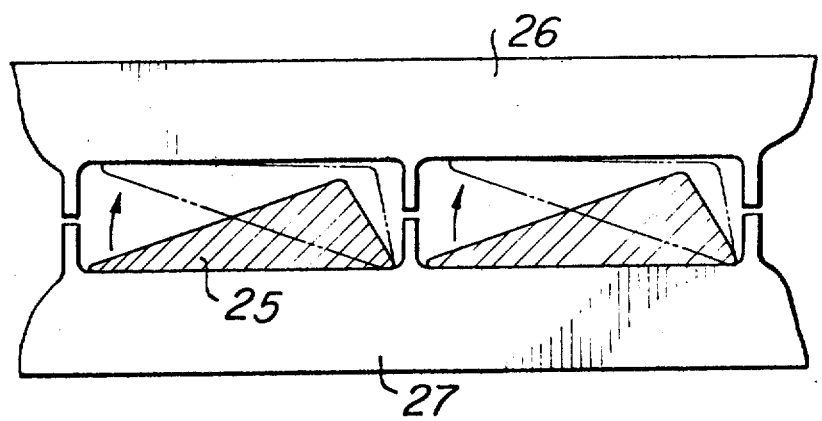
FIG. 8 is a cross-sectional view of another embodiment of a supporting mechanism of the present invention.

In FIG. 8, a solid movable element 25 having the same available surface as the movable element 17 of FIG. 6 is shown, and is arranged in a space formed by a pair of an upper supporting element 26 and a lower supporting element 27. Each movable element is placed on a cut-away or recess part provided stage wise on the lower supporting element 27 and the maximum degree of opening of the movable element 25 is limited to the position of the upper supporting element 26, as shown by the dotted line.

Figure 9:
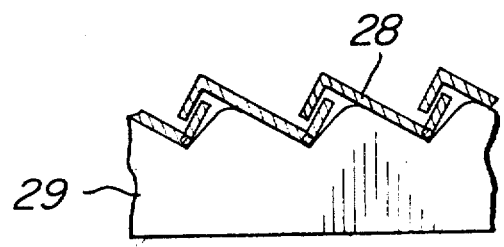
FIG. 9 is a cross-sectional view of another embodiment of the present invention.

In FIG. 9, movable elements 28 having Z-shaped cross-sections are arranged on a supporting member 29 having flat-top projections at positions corresponding to the positions of the movable element so that the movable elements may be overlapped with one another at their ends. Such an arrangement of the movable elements 28 is preferable in the case of gas-liquid contact, because the uprising mists can be separated thereby.

In the present invention, it is desirable that the movable elements of the tray be moved together at the same time through an interconnection, while keeping an equal degree of opening.

To move the movable elements together by an interconnection, various mechanisms are applicable, but the simplest mechanism is obtained by providing at least one common bar across a set of movable elements to establish an interconnection among the set of the movable elements. The respective movable elements and the common bar, that is, the interconnecting element, are, in the most cases, interconnected with one another by providing cut-away or recess parts on the movable elements or the interconnecting element or both and engaging the respective movable elements with the interconnecting element in the same manner as the movable elements are pivotally supported on the supporting member.

Figure 10:
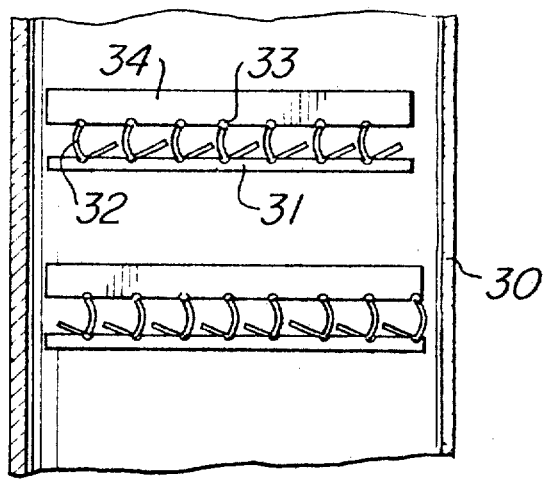
FIG. 10 is a cross-sectional view of one embodiment of a supporting mechanism combined with the interconnecting elements of the present invention.

In FIG. 10, L-shaped movable elements 32 arranged on a supporting member 31 fixed to an outer shell of a fluid contactor apparatus are interconnected with a common bar 34 having cut-away or recess parts 33 corresponding to the respective movable elements 32 and being placed on the movable elements 32 and are capable of moving together at the same time to the equal degree of opening by means of the interconnecting bar 34.

Figure 11:
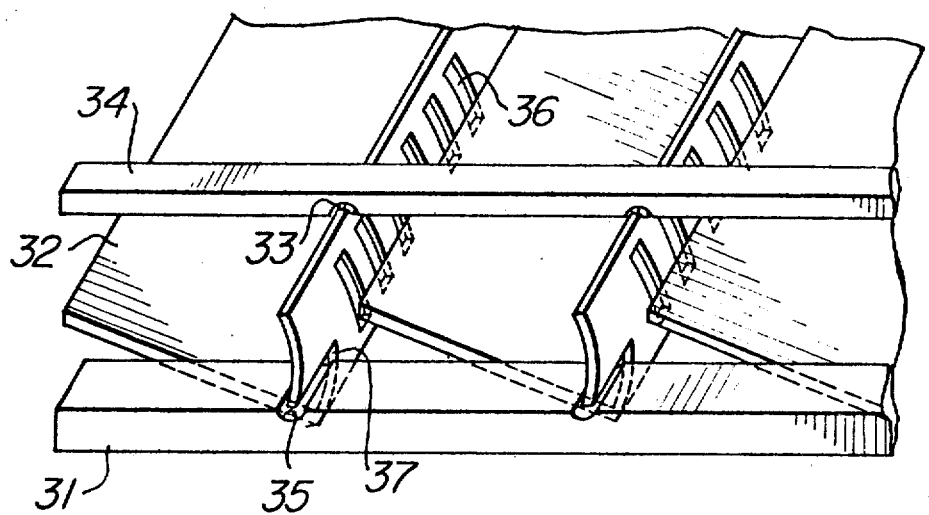
FIG. 11 is a schematic view of the supporting mechanism and the interconnecting mechanism of FIG. 10.

In FIG. 11, the supporting and interconnecting mechanism of FIG. 10 is illustrated in detail. The supporting member 31 has cut-away or recess parts 35 for supporting the movable elements 32, and the movable elements 32 consist of L-shaped members having slots 36 on one side. At each end of the movable element 32, there is a cut-away or recess part 37 corresponding to the cut-away or recess part 35 of the supporting element and the movable element 32 is pivotably supported on the supporting member 31 through the engagement of the cut-away or recess part 37 of the movable element with that of the supporting member. Further, a common bar or interconnecting element 34 having cutaway or recess parts 33 corresponding to cut-away or recess parts provided on the movable elements 32 is placed on the movable elements 32 through the engagement of the cut-away or recess parts of the interconnecting member with those of the movable elements.

Figure 12:
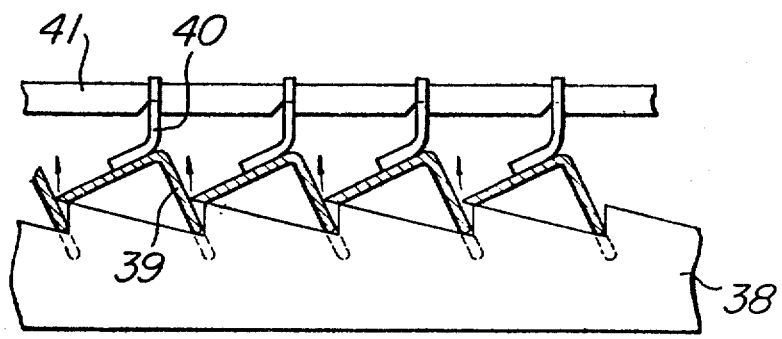
FIGS. 12 and 13 show another embodiments of the interconnecting mechanisms of the present invention.
Figure 13:
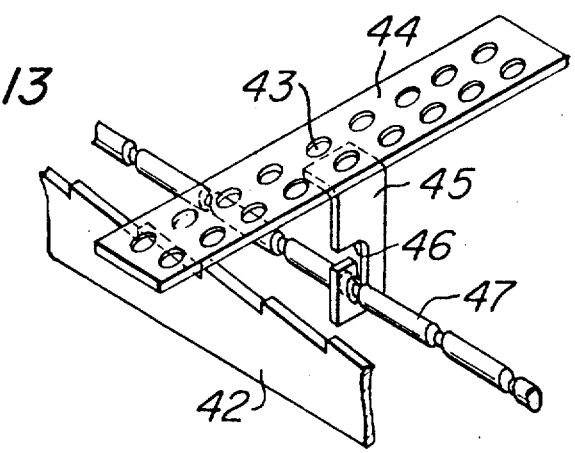

In FIGS. 12 and 13, other pieces are fixed to the respective movable elements and are further interconnected to the interconnecting element. In FIG. 12, other pieces 40 are provided at the upper sides of L-shaped movable elements 39 supported by a supporting element 38 through mutual engagement by means of the cut-away or recess parts of the respective elements and supporting member and are interconnected to a common bar 41 provided above the movable elements in the same manner as shown in FIG. 11. Further in FIG. 13, another piece 45 is provided at the bottom side of a flat movable element 44 provided with a large member of perforations 43 on the entire surface of the movable element and supported on a supporting member 42 at the cut-away or recess part of the supporting member through the engagement. The piece 45 has a cut-away or recess part 46 and a common bar 47 having a cut-away or recess part corresponding to said cut-away or recess part 46 is inserted into the cut-away or recess part 46, whereby the movable pieces 44 are interconnected to the common bar 47 by means of the pieces 45.

In some case, it is desirable, when the movable elements are to be moved together, that the elements be moved stage-wise.

Figure 14:
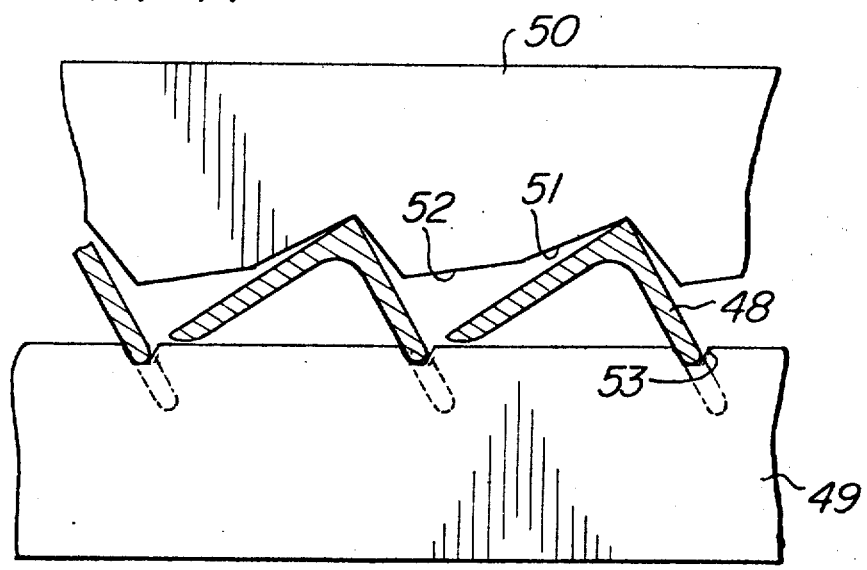
FIG. 14 is a cross-sectional view showing one embodiment of an interconnecting element of the present invention.

In FIG. 14, movable elements 48 are supported on and across a supporting member 49 in the same manner as shown in FIG. 12. A common bar 50 having cut-away or recess parts containing two differently-inclined faces 51 and 52 at the contact surface with the movable element 48 is provided on and across the movable elements. The respective movable element can be easily moved until they contact the inclined face 51. When the entire movable elements have the equal degree of opening through the full contact of the inclined face 51 with the contact side of the movable element, the secondary floating starts to take place. During the movement, the movable elements move around a recess 53 as a pivot, and naturally fluid passages are formed between the adjacent movable elements. Stagewise movement of the movable elements can be also attained by properly selecting a shape of the interconnecting pieces provided on the movable elements.

Figure 15:
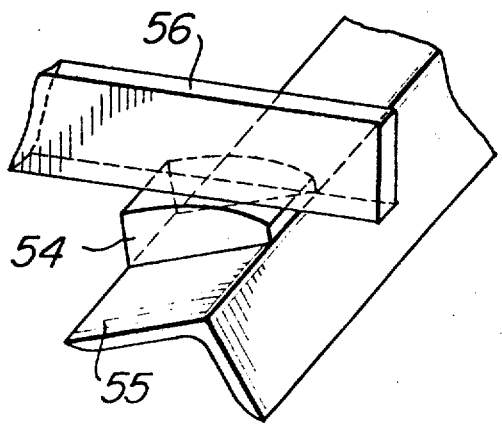
FIG. 15 is a schematic view of another embodiment of the interconnecting element of the present invention.

In FIG. 15, an interconnecting piece 54 having a curved face is fixed to one side of a shaped movable element 55, and a flat bar 56 serving as the common bar is placed on the interconnecting piece to interconnect the movable element 55 therewith. Movement of the movable elements 55 can be multistagewise made thereby in a continuous manner.

According to the present invention, various modification of a tray can be made by properly selecting the shape of a movable element, and arrangement and supporting or interconnecting mechanism of the movable elements. For example, a movable element having a T-shaped cross-section or a semi-circular cross-section can be arranged, with the projected side up or down, in a movable manner. Furthermore, it is easy through a proper selection of an arrangement and supporting mechanism of the movable elements, to pass an uprising fluid through fluid passages in a desired direction within a range from the horizontal direction to the nearly upright direction or a mutually opposite direction or whirling direction, irrespective of the equal direction. Furthermore, it is possible to make the fluid pass in any desired direction other than the parallel flow on the tray, for example, by controlling the movement of every other movable elements, if desired.

According to the spirit of the present invention, various operating conditions for the fluid contact, for example, a fluid distribution, division of fluid flow, mixing proportion, fluid hold-up on a tray, a fluid pressure drop of a tray, etc., can be selected according to the physical properties and service conditions of a fluid to be treated.

Any material usually used in the industry, such as metallic materials, various synthetic resin materials ceramics and their compounds alone or in combination, can be used as a material of construction for the tray, depending upon the property of a fluid to be treated.

According to the present invention, fluid contact is carried out mainly through fluid passages formed between the adjacent movable elements themselves according to a flow rate of fluid applied to a tray as well as on the movable elements themselves, and therefore a proportion of an available passage for contact per an area of a tray can be made larger than those of the hereto well-known trays and therefore a treating capacity of a tray can be much more increased. Furthermore, the degree of opening of a set of movable elements can be adjusted according to a flow rate of a fluid, and therefore a fluid contact can be effectively maintained even under a small flow rate of a fluid. Particularly, when the movable elements are made to move together by an interconnection, all of the movable elements can be actuated together even against a local flow of a fluid, and a contact efficiency can be increased thereby.

Therefore, an effective fluid contact can be carried out with the present tray within a wide range of flow rates of a fluid to be treated and the present tray has more stable operating properties against fluctuations in load of a fluid.

Furthermore, the present tray has less component members and its structure is so simple that the present tray can be easily assembled or disassembled.

The present tray can be utilized in a gas or vapour-liquid contactor apparatus for distillation, rectification, absorption, etc. or in a liquid-liquid or heat exchanging liquid-solid contactor apparatus for extraction and washing or a gas-solid contactor apparatus such as fluidized bed or air-slide. That is, the present tray can increase a fluid contact efficiency and an operating efficiency in such industrial fields as petroleum refining, air separation, gas absorption, waste material removal, extraction, drying, etc.

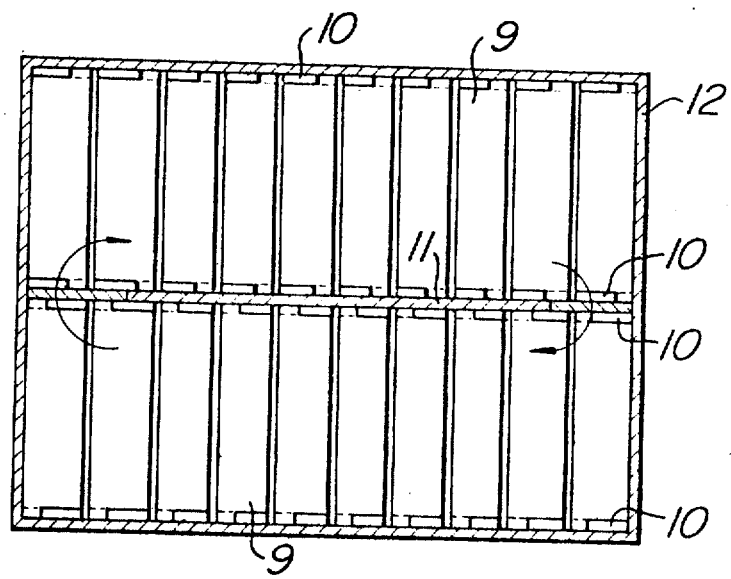
FIG. 4
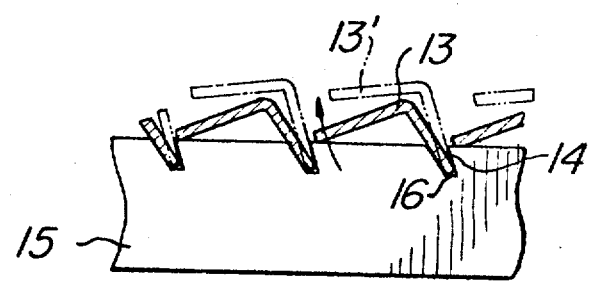
FIG. 5
FIG. 6
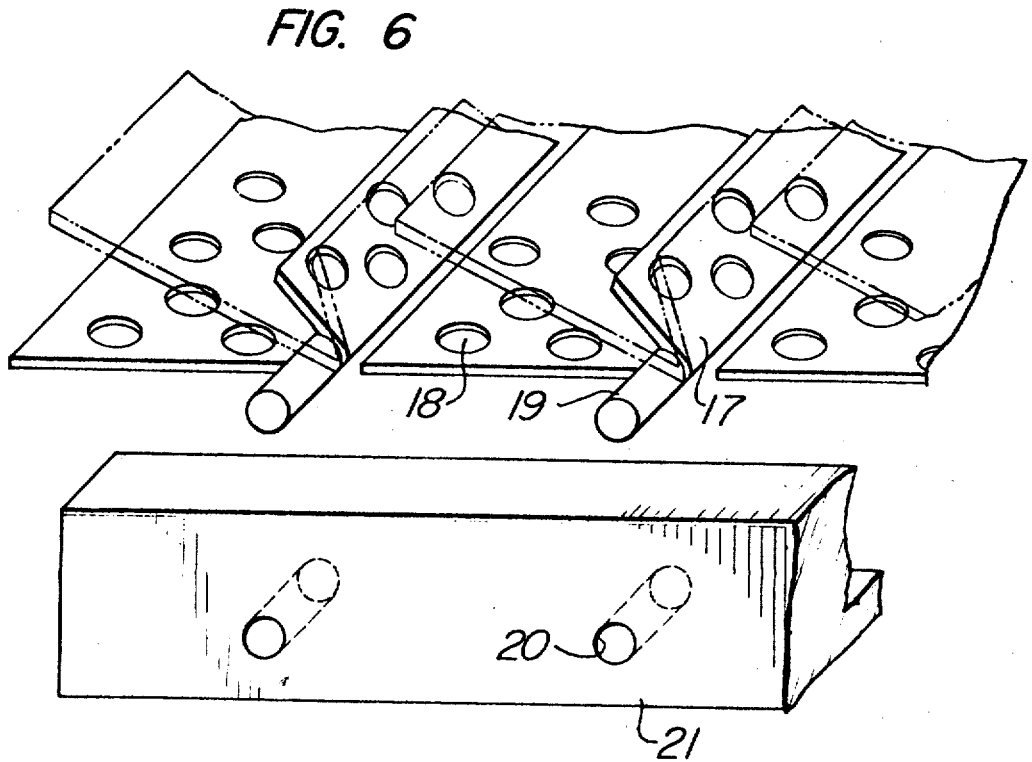

What is claimed is:

1. A tray for fluid contacting comprising a plurality of elongated tiltable elements in the form of planar flat bars, planar, elongated, parallel supporting bars extending transversely to said flat bars for supporting said flat bars in spaced relation to one another, the supporting bars being spaced from one another and spaced intermediate the ends of said flat bars, said supporting bars having vertically oriented crosssections and further having recesses at spaced intervals therealong for receiving a portion of said flat bars, said flat bars abutting said support bars at mutual points of contact, said flat bars pivoting with respect to said support bars about said mutual points of contact so that each of said flat bars is tiltable with respect to the respective recesses to define fluid flow passages between adjacent flat bars, the flat bars being spaced from one another to define slit-like passages between adjacent bars in a load-free state and being tiltable in the same direction in a restricted range for varying the area of said passages in response to the flow rate of fluid and the fluid load conditions, the recesses in said supporting bars being shaped to allow said flat bars to pivot between a closed position in which the area of said passages is at a minimum and a maximum open position only.

2. A tray according to claim 1, wherein the flat bars have perforations for fluid passage therethrough.

3. A tray according to claim 1, wherein the flat bars are divided into at least two sections in a longitudinally extended direction and supported by the supporting bars.

4. A tray according to claim 1, wherein the angle through which the flat bars pivot between said closed position and said maximum open position is an acute angle.

5. A tray according to claim 1, wherein said flat bars are coplanar when in said closed position.

6. A tray according to claim 1, further comprising at least one interconnecting element means for engaging each of the flat bars for ensuring that each of the flat bars tilt in the same manner.

7. A tray according to claim 6, wherein the flat bars have perforations for fluid passage therethrough.

* * * * *

UNITED STATES PATENT OFFICE
CERTIFICATE OF CORRECTION

Patent No. 3,894,128      Dated July 8, 1975

Inventor(s) Shoichi Hirao et al.

It is certified that error appears in the above-identified patent and that said Letters Patent are hereby corrected as shown below:

The present sheets of drawing should be cancelled and the attached sheets substituted therefor, as part of the Letters Patent.

Signed and Sealed this sixteenth Day of March 1976

[SEAL]

*Attest:*

RUTH C. MASON
*Attesting Officer*

C. MARSHALL DANN
*Commissioner of Patents and Trademarks*